United States Patent
Walkowski (10) Patent No.: US 10,059,196 B2
(45) Date of Patent: Aug. 28, 2018

(54) WEIGHTED FLAPPER AND SPLINED ORIFICE PLATE FOR VENT VALVE

(71) Applicant: Eaton Corporation, Cleveland, OH (US)

(72) Inventor: Paul D. Walkowski, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 15/434,820

(22) Filed: Feb. 16, 2017

(65) Prior Publication Data

US 2017/0158047 A1    Jun. 8, 2017

Related U.S. Application Data

(63) Continuation of application No. PCT/US2015/045454, filed on Aug. 17, 2015.

(60) Provisional application No. 62/038,886, filed on Aug. 19, 2014, provisional application No. 62/197,918, filed on Jul. 28, 2015.

(51) Int. Cl.
*B60K 15/03* (2006.01)
*B60K 15/035* (2006.01)

(52) U.S. Cl.
CPC .............................. *B60K 15/03519* (2013.01)

(58) Field of Classification Search
CPC . F02M 37/20; F16K 24/044; Y10T 137/3099; Y10T 137/0874; Y10T 137/3084; Y10T 137/3087; Y10T 137/309; B60K 15/03519

USPC ................. 137/409, 43, 202, 199, 198, 197; 251/359, 363

See application file for complete search history.

(56) References Cited

U.S. PATENT DOCUMENTS

| | | | | |
|---|---|---|---|---|
| 2,649,273 | A | * 8/1953 | Honegger | ................. F16K 1/42 251/118 |
| 4,886,089 | A | * 12/1989 | Gabrlik | ............ B60K 15/03519 137/202 |
| 5,605,175 | A | 2/1997 | Bergsma et al. | |

(Continued)

FOREIGN PATENT DOCUMENTS

WO        2014011229 A1    1/2014

OTHER PUBLICATIONS

International Search Report and Written Opinion for International Application No. PCT/US2015/045454 dated Nov. 25, 2015, 14 pages.

(Continued)

*Primary Examiner* — Eric Keasel
(74) *Attorney, Agent, or Firm* — RMCK Law Group PLC (57) ABSTRACT

A vent valve for a fuel system includes a float, a flapper assembly and an orifice plate. The flapper assembly has a flapper and a seal mounted on or fixed to the flapper. The flapper assembly can be movably engaged with the float. The orifice plate can have a plate body that includes a nipple portion extending to a terminal end that defines a valve seat. The valve seat comprises an orifice having splines arranged around an outer diameter thereof. The seal is configured to selectively engage the valve seat between a sealed, closed position and an unsealed, open position. The splines facilitate movement of the seal from the closed position to the open position with reduced reopening force.

20 Claims, 11 Drawing Sheets

(56) References Cited

U.S. PATENT DOCUMENTS

| | | | | |
|---|---|---|---|---|
| 5,950,659 | A * | 9/1999 | Szlaga | F16K 24/048 137/202 |
| 6,666,433 | B1 * | 12/2003 | Pierce | F16K 25/00 251/123 |
| 6,918,405 | B2 * | 7/2005 | Leonhardt | B60K 15/03519 137/202 |
| 7,168,441 | B2 * | 1/2007 | Miyoshi | B60K 15/03519 137/202 |
| 7,607,450 | B2 * | 10/2009 | Park | F16K 24/044 137/202 |
| 7,891,371 | B2 * | 2/2011 | Pifer | F16K 24/044 137/202 |
| 8,118,051 | B2 * | 2/2012 | Arnalsteen | B60K 15/03519 137/202 |
| 9,050,886 | B2 * | 6/2015 | Honda | B60K 15/03519 |
| 9,884,550 | B2 * | 2/2018 | Walkowski | B60K 15/03519 |
| 2002/0157706 | A1 | 10/2002 | Bergsma | |
| 2003/0173538 | A1 | 9/2003 | Brennecke et al. | |
| 2004/0003844 | A1 | 1/2004 | Yamada et al. | |
| 2004/0238033 | A1 | 12/2004 | Miyoshi et al. | |
| 2005/0115636 | A1 * | 6/2005 | Cheng | B60K 15/03519 141/301 |
| 2010/0089466 | A1 | 4/2010 | Kobayashi et al. | |
| 2011/0315240 | A1 | 12/2011 | Müller et al. | |

OTHER PUBLICATIONS

European Search Report for EP Application No. 15833564.6 dated Mar. 1, 2018, 7 pages.

* cited by examiner

WEIGHTED FLAPPER AND SPLINED ORIFICE PLATE FOR VENT VALVE

CROSS-REFERENCE TO RELATED APPLICATIONS

This application is a continuation of International Application No. PCT/US2015/045454 filed Aug. 17, 2015, which claims the benefit of U.S. Patent Application No. 62/038,886 filed on Aug. 19, 2014 and U.S. Patent Application No. 62/197,918 filed on Jul. 28, 2015. The disclosures of the above applications are incorporated herein by reference.

FIELD

The present disclosure relates generally to a vent valve for a fuel storage system and more particularly to a weighted flapper and an orifice plate used with a flapper of the vent valve.

BACKGROUND

A vehicle fuel tank can include a vent valve communicating with a fuel tank. The vent valve can allow air and/or fuel vapor to escape the fuel tank as the fuel tank is being filled. The vent valve can include an elastomeric seal mounted on a flapper. The combined elastomeric seal and flapper can be referred to as a flapper assembly. The elastomeric seal can seal against a valve seat.

Generally, the flapper assembly can ride on a float that is positioned within the fuel tank or on a lever system associated with the float. It can be desirable to allow the flapper assembly to be moveable relative to the float so that misalignment of the float with the valve seat will not inhibit the flapper assembly from being flush with the valve seat during sealing. As the liquid in the fuel tank rises, the float rises and lifts the flapper assembly against the valve seat to close the vent valve. When the rate of air/vapor flow through the vent valve becomes relatively high, the flapper assembly can be drawn up, off of the float, and into engagement with the valve seat.

The background description provided herein is for the purpose of generally presenting the context of the disclosure. Work of the presently named Inventor, to the extent it is described in this background section, as well as aspects of the description that may not otherwise qualify as prior art at the time of filing, are neither expressly nor impliedly admitted as prior art against the present disclosure.

SUMMARY

A vent valve for a fuel system includes a float, a flapper assembly, an orifice plate and a spring. The flapper assembly has a rigid flapper and a flexible elastomer seal mounted together. The flapper assembly can be movably engaged with the float. The orifice plate can have a plate body that includes a nipple portion extending to a terminal end that defines a valve seat. The valve seat comprises an orifice and may have splines arranged around an outer diameter thereof. The seal is configured to selectively engage the valve seat between a sealed, closed position and an unsealed, open position. The splines facilitate movement of the seal from the closed position to the open position with reduced reopening force. The splines create a small leak as the valve reopens equalizing the pressure and allowing the valve to reopen at higher pressures with the same force.

According to additional features, the splines are uniformly arranged around the valve seat. The orifice plate can be formed of plastic. In one configuration the splines are in the form of rounded inlets. In another configuration the splines are in the form of radial inlets. In other configurations the splines are in the form of radial inlets. In another configuration the splines are in the form of triangular inlets. In other configurations the splines are in the form of v-shaped inlets. The splines can alternatively be in the form of rectangular inlets.

In other features, the vent valve can further include at least one protuberance engaged with the flapper. The protuberance can be spaced from the seal increasing a weight of the flapper. The at least one protuberance can be further defined as a plurality of protuberances. The plurality of protuberances can be positioned on opposite sides of the flapper or situated around the flapper. The plurality of protuberances can be balanced with respect to one another or the flapper assembly can be balanced with respect to a pin atop the float. In one configuration the at least one protuberance and the flapper can have substantially the same thickness. The float can include a plurality of fingers extending from an upper surface. The fingers locate inside of a ring extending from the orifice plate in the sealed, closed position. The fingers can have first tapers arranged on distal ends thereof. The ring on the orifice plate can have a second taper arranged on an inner diameter thereof. The first and second tapers can cooperate to guide the float toward the sealed, closed position.

A vent valve for a fuel system and constructed in accordance to another example of the present disclosure includes a float, a flapper assembly, an orifice plate and at least one protuberance. The flapper assembly has a flapper and a seal mounted on or affixed to the flapper. The flapper assembly is movable engaged with the float. The orifice plate has a plate body that includes a nipple portion extending to a terminal end that defines a valve seat. The valve seat comprises an orifice. The at least one protuberance is engaged with the flapper. The seal is configured to selectively engage the valve seat between a sealed, closed position and an unsealed, open position.

According to other features the orifice has splines arranged around an outer diameter thereof. The splines facilitate movement of the seal from the closed position to the open position with reduced reopening force. The at least one protuberance is further defined as a plurality of protuberances. In another configuration, the flapper assembly is balanced with respect to a pin atop the float. The at least one protuberance and the flapper can have substantially the same thickness. The spines can be at least one of rounded, radial, triangular and v-shaped.

BRIEF DESCRIPTION OF THE DRAWINGS

The present disclosure will become more fully understood from the detailed description and the accompanying drawings, wherein.

DETAILED DESCRIPTION

The present disclosure provides a flapper having enhanced mass to improve the flapper assembly from being lifted off of a float prematurely. When the air flow through the vent valve becomes relatively high, the enhanced mass of the flapper assembly can improve the flow of vapor through the vent valve by drawing the flapper assembly away from the float and preventing premature engagement with the valve seat. A thickness of the flapper can be increased to enhance mass. The additional mass can be added to an end of the flapper to make the flapper more balanced. Further, the enhanced mass can promote the flapper assembly dropping down out of engagement with the valve seat or air stream as the amount of fuel in the fuel tank diminishes.

Figure 1:
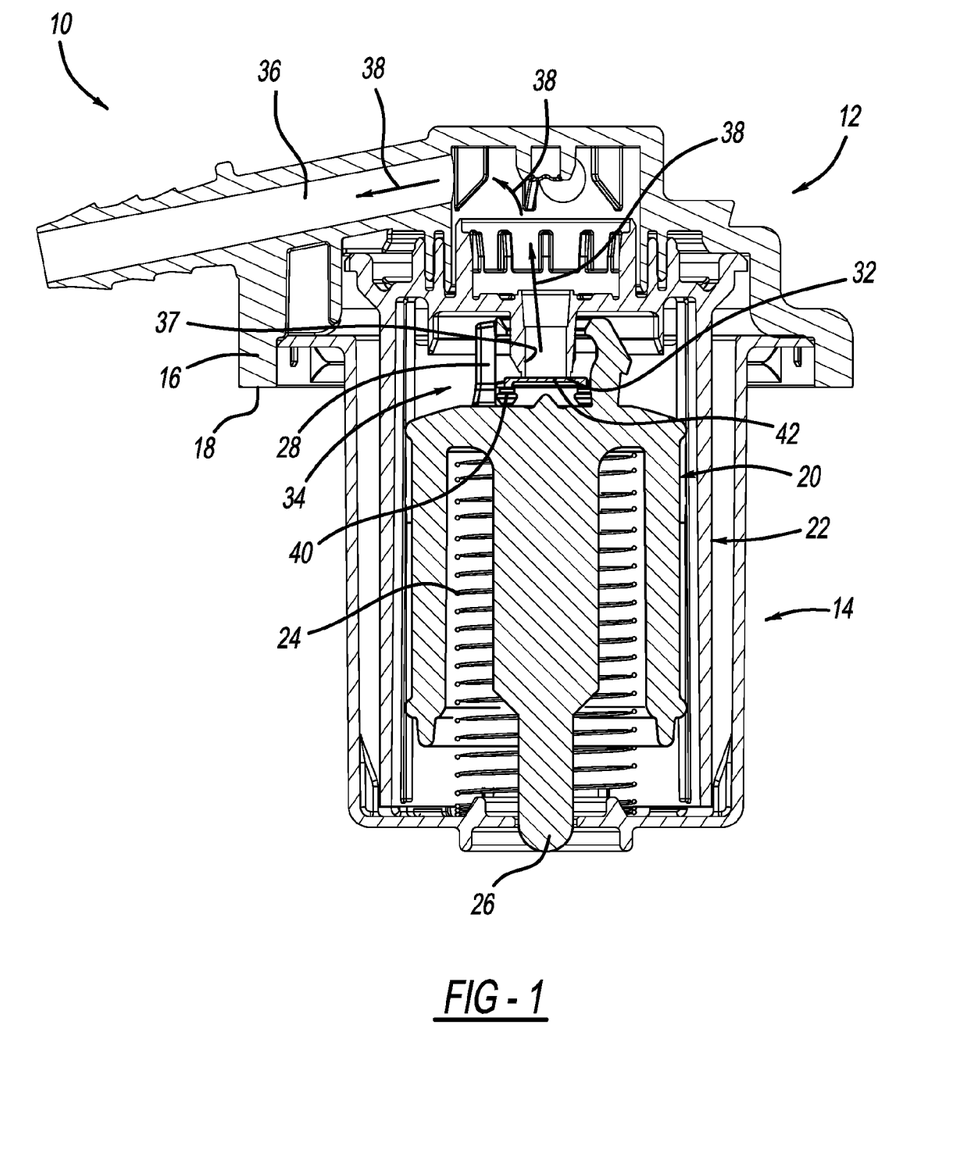
FIG. 1 is a cross-sectional view of a vent valve constructed in accordance to one example of the present disclosure.

Referring now to FIG. 1, a vent valve 10 can include a mount 12 and a housing 14 fixed together, such as by welding or adhesive for example. The mount 12 can include a circular leg 16 that can be fixed to a fuel tank (not shown), such as by some form plastic welding, along a surface 18. The housing 14 can therefore project into the fuel tank.

The housing 14 can house a float 20, one or more float guides such as a float guide 22, and a spring 24. The float 20 can include a portion 26 communicating with an interior of the fuel tank. The portion 26 can contact fuel in the fuel tank. As the level of liquid fuel in the fuel tank rises, the floating 20 including the portion 26 can be urged upwardly. The one or more float guides, including float guide 22, can guide the motion of the float 20 as the level of liquid fuel in the fuel tank rises. The spring 24 can maintain the float 20 in a predetermined position when the level of liquid fuel in the fuel tank reaches a predetermined level to limit the extent of travel of the float 20.

The float 20 can include a collar 28 and the float guide 22 can include a tubular portion 30. The tubular portion 30 can define an orifice 37 for receiving and directing vapor. The collar 28 can encircle the tubular portion 30. During movement of the float 20, the collar 28 can slide along the tubular portion 30. The tubular portion 30 can define a valve seat 32.

A flapper assembly 34 can ride on the float 20. The flapper assembly 34 can include a flapper 40 and seal 42 mounted on the flapper 40. In various examples, the flapper 40 and seal 42 can be snapped together or the seal 42 can be over-molded on the flapper 40. The flapper assembly 34 can be moveable relative to the float 20 so that misalignment of the float 20 with the valve seat 32 will not inhibit the flapper assembly 34 from being flush with and sealing against the valve seat 32. As the level of the liquid in the fuel tank rises, the float 20 rises and lifts the flapper assembly 34 against the valve seat 32 to close the vent valve 10. As the level of the liquid in the fuel tank lowers, the float 20 lowers and the flapper assembly 34 is tugged down from the orifice defined by the tubular portion 30 by the post near feature 46 and peels the flapper away from against the valve seat 32 to open the vent valve 10.

As the level of liquid fuel in the fuel tank rises, air and/or fuel vapor can escape the fuel tank through the orifice 37 of the vent valve 10. The air and/or fuel vapor can pass through tubular portion 30 and through a passageway 36 formed in the mount 12. The passage of the air and/or fuel vapor is referenced at 38.

Figure 3:
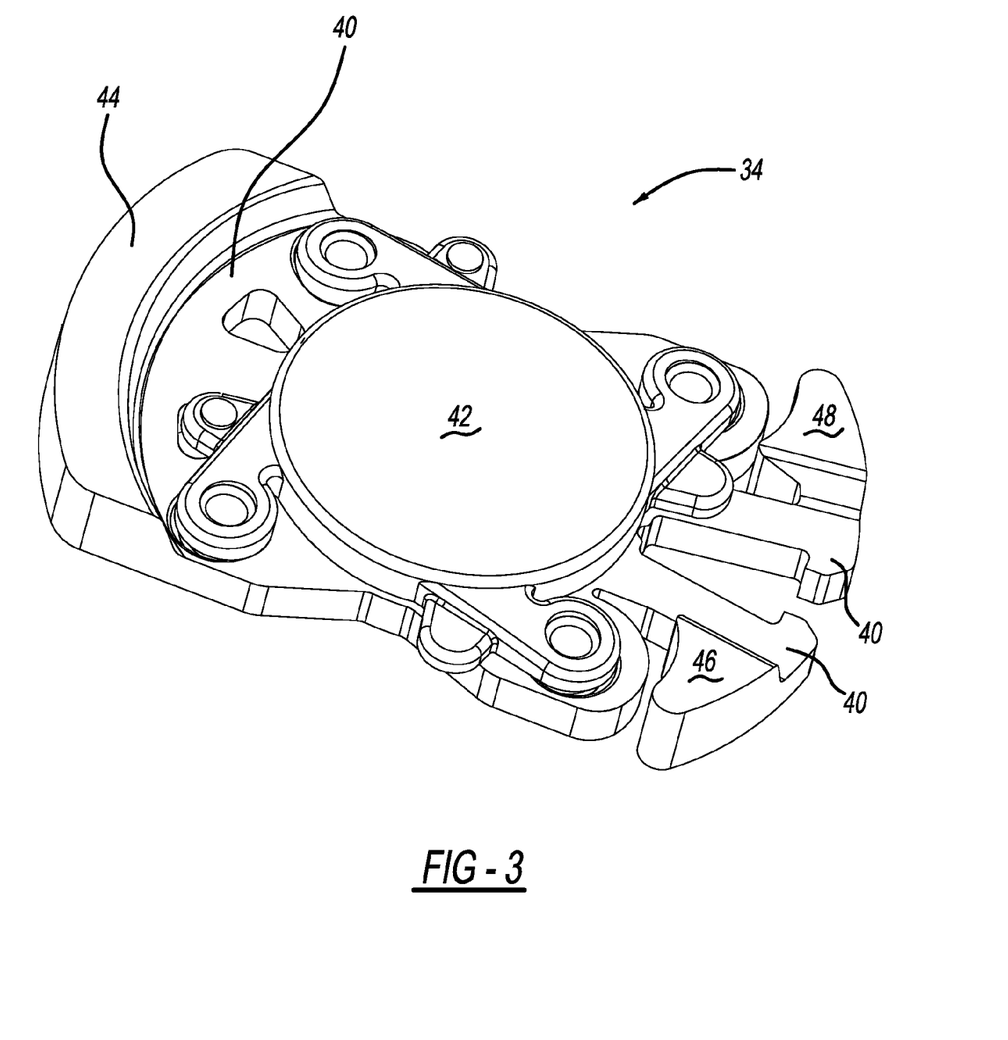
FIG. 3 is a perspective view of a flapper assembly shown in FIGS. 1 and 2.
Figure 4:
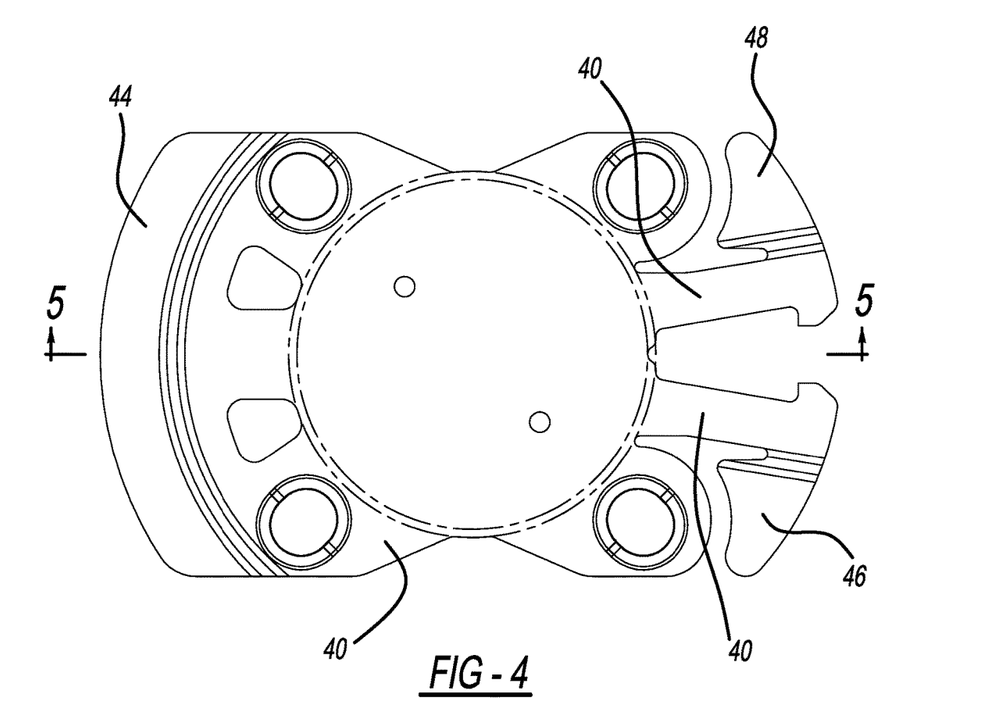
FIG. 4 is a top view of a flapper shown in FIGS. 1-3.
Figure 5:
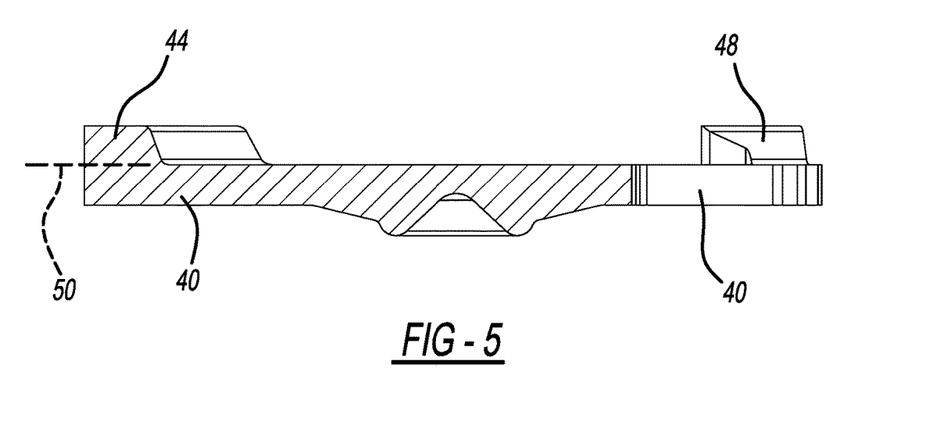
FIG. 5 is a cross-sectional view of the flapper shown in FIGS. 1-4, taken along sections lines 5-5 in FIG. 4.

The flapper assembly 34 can include weighted portions to inhibit the flapper assembly 34 from being drawn up against the valve seat 32 when the air/vapor flow through the vent valve 10 becomes relatively high. Referring now to FIGS. 3-5, the flapper 40 can include protuberances 44, 46, and 48.

Figure 2:
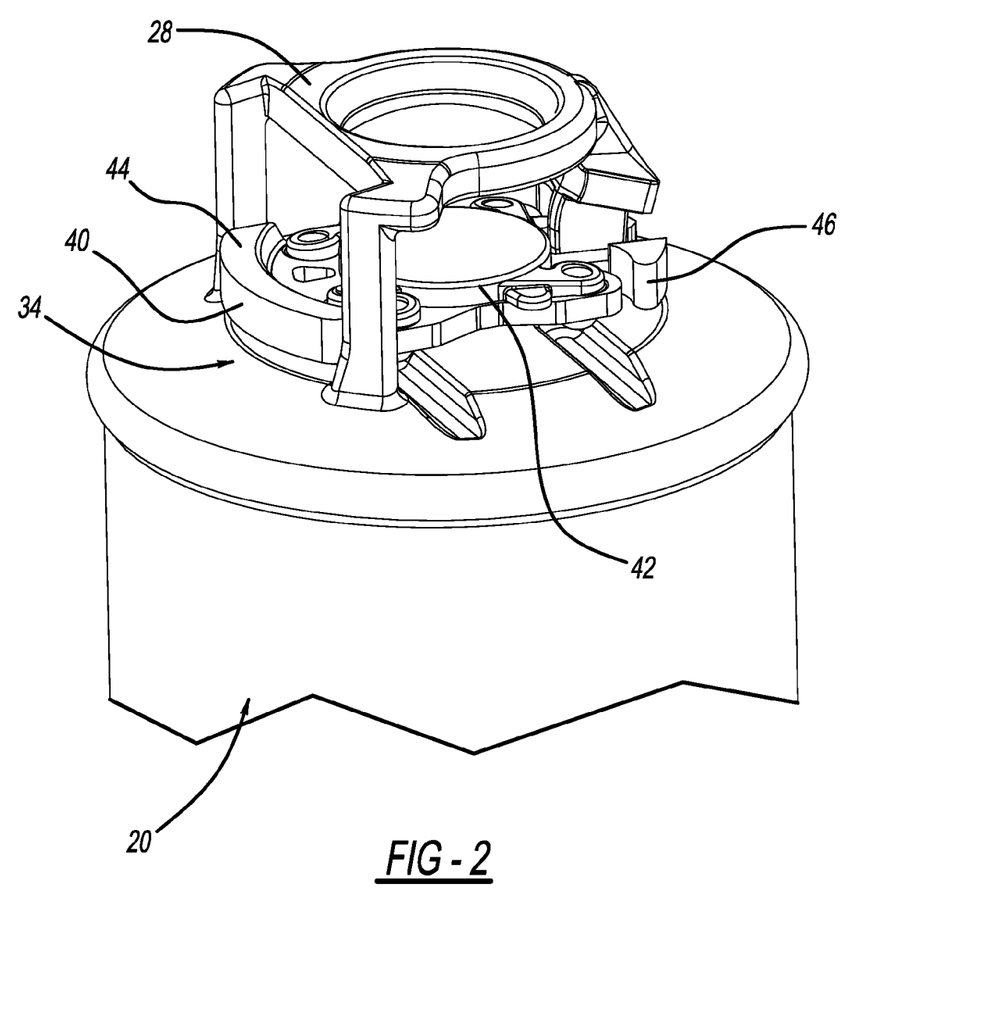
FIG. 2 is a first perspective view of a portion of the vent valve shown in FIG. 1.

The exemplary protuberances 44, 46, and 48 may or may not play a role in guiding the movement of the flapper assembly 34 relative to the float 20 (referenced in FIGS. 1 and 2). As shown in FIG. 1, a pin 39 atop the float 20 and cone 41 on the plastic flapper 40 can orient the seal 42 beneath the orifice 37 during valve closure. The exemplary protuberances 44, 46, and 48 may or may not play a direct role in sealing, as sealing can be performed directly by the flapper 40 and the seal 42. The exemplary protuberances 44, 46, and 48 can play an indirect role in sealing, such as by urging disengagement between the valve seat 32 and the seal 42 when the float 20 lowers.

In the illustrated example, the protuberances 44, 46, and 48 are integrally-formed with respect to the flapper 40, which can have a generally plate-like shape. A reference line 50 can be the boundary between the flapper 40 and the protuberance 44, for example. The protuberances 44, 46, and 48 can be positioned adjacent to a top surface of the flapper 40 or a bottom surface of the flapper 40. In some examples of the present disclosure, the protuberances 44, 46, and 48 can be separately-formed and later affixed to the flapper 40. The protuberances 44, 46, and 48 may also be attached to a side of the flapper 40 in some examples of the present disclosure.

In some examples, less than three or more than three protuberances can be engaged with the flapper. The protuberances 44, 46, and 48 can be sized and shaped similarly or differently. The protuberances 44, 46, and 48 can be positioned about the flapper 40 symmetrically or asymmetrically. In the illustrated example, the protuberance 44 is sized and positioned to be balanced with respect to the protuberances 46 and 48.

The size, position and number of protuberances can be selected in view of the operating environment of the flapper 40. For example, the size, position and number of protuberances can be selected through an iterative testing process. In the illustrated example, the protuberances 44, 46 and 48 are substantially as thick as the flapper 40 and positioned on opposite sides of the flapper 40.

Figure 6:
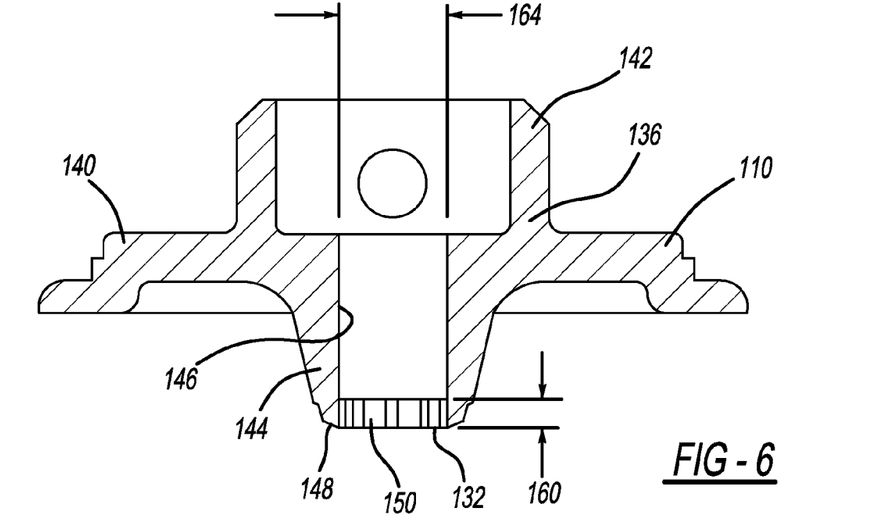
FIG. 6 is a cross-sectional view of a splined orifice plate for a vent valve and constructed in accordance to one example of the present disclosure.
Figure 7:
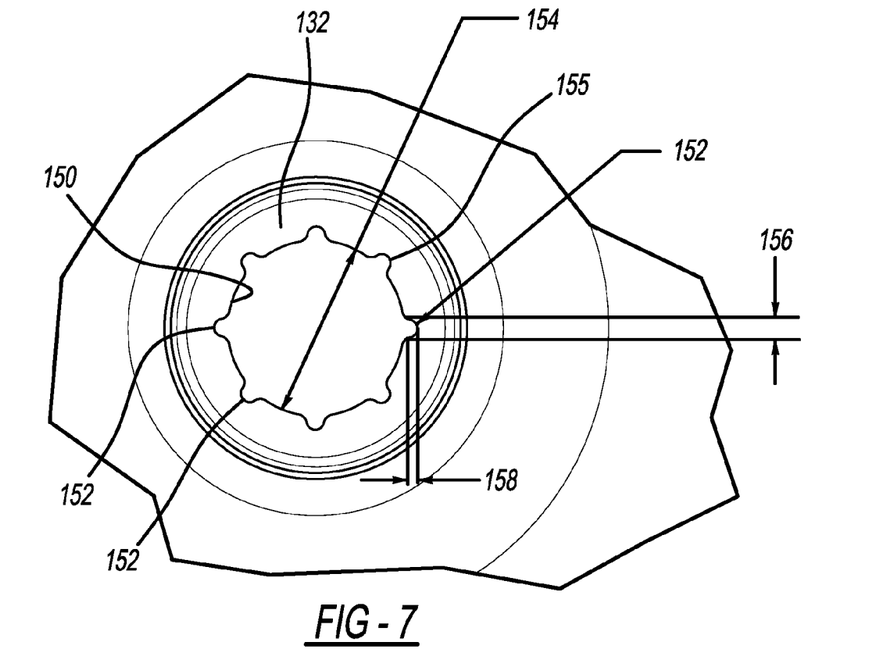
FIG. 7 is a detail top view of an opening of the orifice plate shown in FIG. 6.
Figure 8:
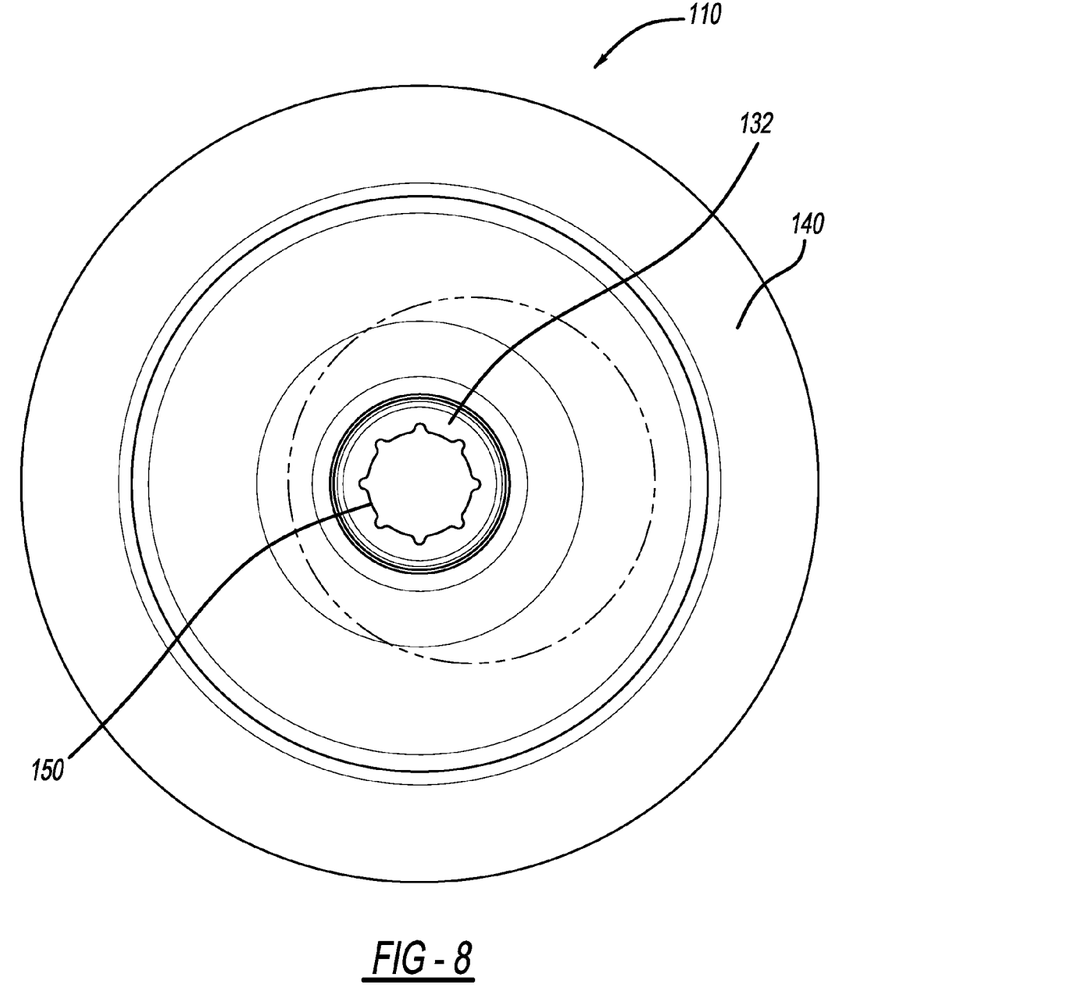
FIG. 8 is a top view of the orifice plate of FIG. 6.

Turning now to FIGS. 6-12, orifice plates constructed in accordance to additional features of the present disclosure will be described. FIGS. 6-8 illustrate an orifice plate 110 according to one example. The orifice plate 110 can be configured for use in a valve such as the vent valve 10 discussed above. Specifically a flapper assembly such as the flapper assembly 34 can be arranged to cooperate with an orifice plate 110 positioned at the tubular portion 30. In this regard, a seal, such as the seal 42 can be arranged to sealingly engage a valve seat 132 formed on the orifice plate 110.

The orifice plate 110 can include a plate body 136 having a flange 140, a downstream portion 142 and a nipple portion 144. A central passage 146 can be defined through the nipple portion 144. The nipple portion 144 has a terminal end 148 that defines the valve seat 132. The valve seat 132 generally comprises an orifice 150 having splines 152 arranged around an outer diameter 154 thereof. The splines 152 are in the form of rounded or radial inlets 155. The radial inlets 155 can have a width 156 and a depth 158. In the example shown, there are eight splines 152. The width 156 can be 0.4 mm. The depth 158 can be 0.25 mm. The outer diameter 156 can be 3.5 mm. The valve seat 132 can have a height 160 of 1.0 mm. The central passage 146 can have a diameter 164 of between 3.0 mm and 4.5 mm. It will be appreciated that these dimensions are merely exemplary. Other dimensions are contemplated.

Figure 9:
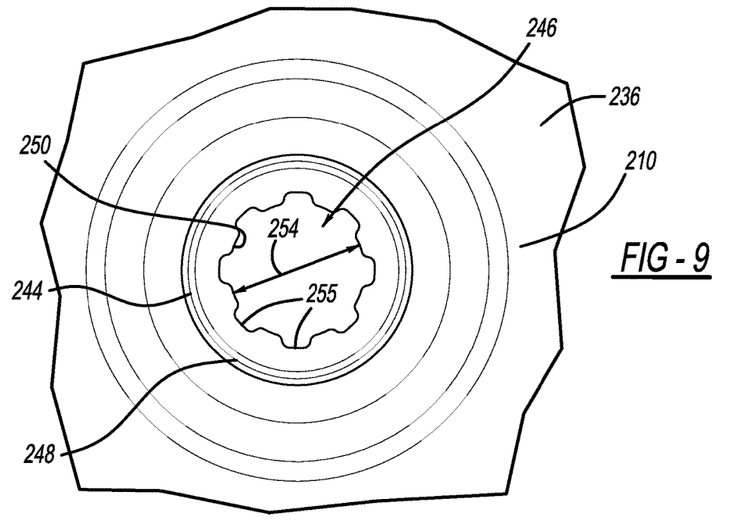
FIG. 9 is a bottom view of an orifice plate having a rectangular spline configuration according to another example of the present disclosure.

With reference to FIG. 9, an orifice plate 210 constructed in accordance to additional features is shown. The orifice plate 210 can include a plate body 236 having a flange (not specifically shown, but constructed like the flange 140, FIG. 6), a downstream portion (not shown) and a nipple portion 244. A central passage 246 can be defined through the nipple portion 244. The nipple portion 244 has a terminal end 248 that defines the valve seat 232. The valve seat 232 generally comprises an orifice 250 having splines 252 arranged around an outer diameter 254 thereof. The splines 252 are in the form of rectangular inlets 255.

Figure 10:
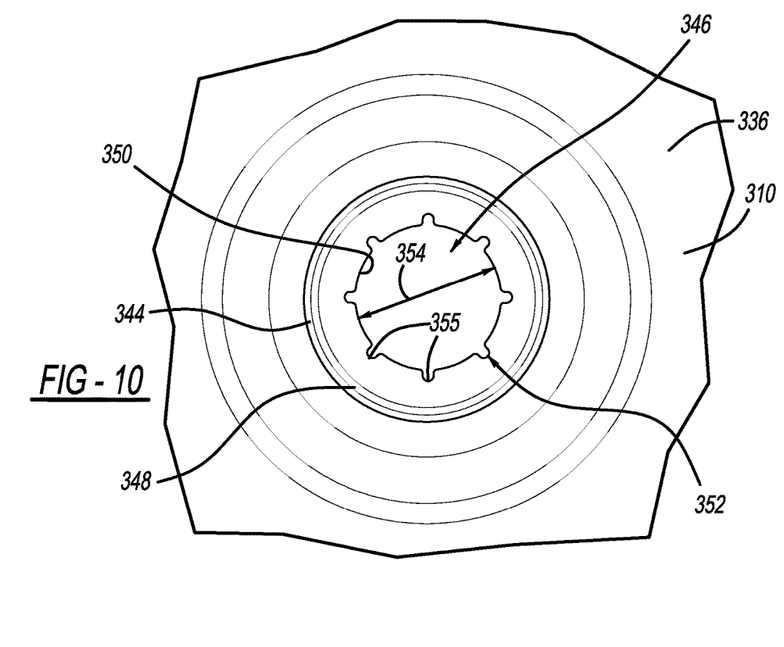
FIG. 10 is a bottom view of an orifice plate having a small rounded spline configuration according to another example of the present disclosure.

With reference to FIG. 10, an orifice plate 310 constructed in accordance to additional features is shown. The orifice plate 310 can include a plate body 336 having a flange (not specifically shown, but constructed like the flange 140, FIG. 6), a downstream portion (not shown) and a nipple portion 344. A central passage 346 can be defined through the nipple portion 344. The nipple portion 344 has a terminal end 348 that defines the valve seat 332. The valve seat 332 generally comprises an orifice 350 having splines 352 arranged around an outer diameter 354 thereof. The splines 352 are in the form of rounded or radial inlets 355. The radial inlets 355 can be configured similar to the inlets 155 (FIG. 7) having a smaller width or diameter.

Figure 11:
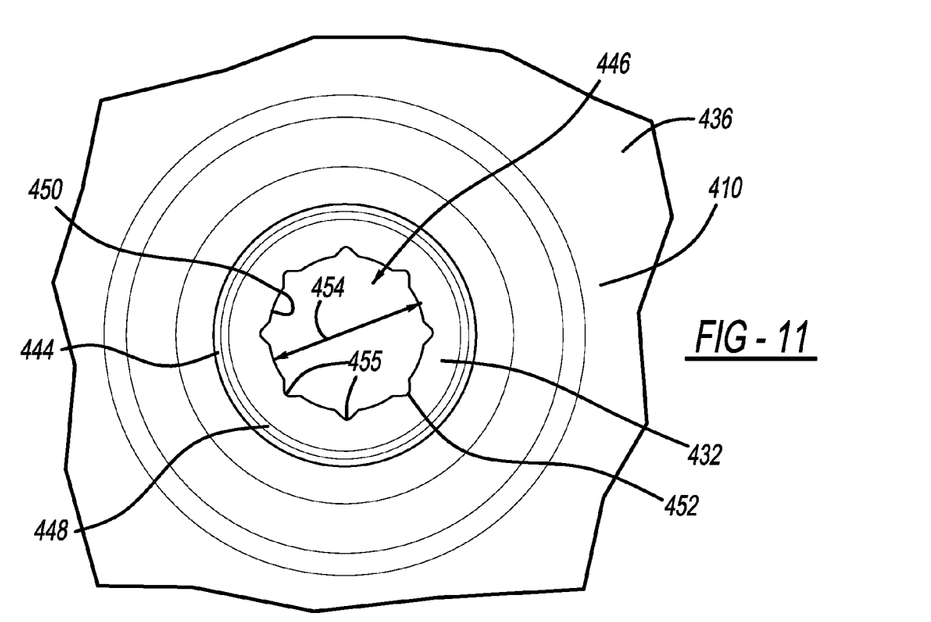
FIG. 11 is a bottom view of an orifice plate having a v-shaped spline configuration according to another example of the present disclosure.

With reference to FIG. 11, an orifice plate 410 constructed in accordance to additional features is shown. The orifice plate 410 can include a plate body 436 having a flange (not specifically shown, but constructed like the flange 140, FIG. 6), a downstream portion (not shown) and a nipple portion 444. A central passage 446 can be defined through the nipple portion 444. The nipple portion 444 has a terminal end 448 that defines the valve seat 432. The valve seat 432 generally comprises an orifice 450 having splines 452 arranged around an outer diameter 454 thereof. The splines 452 are in the form of triangular or v-shaped inlets 455.

Figure 12:
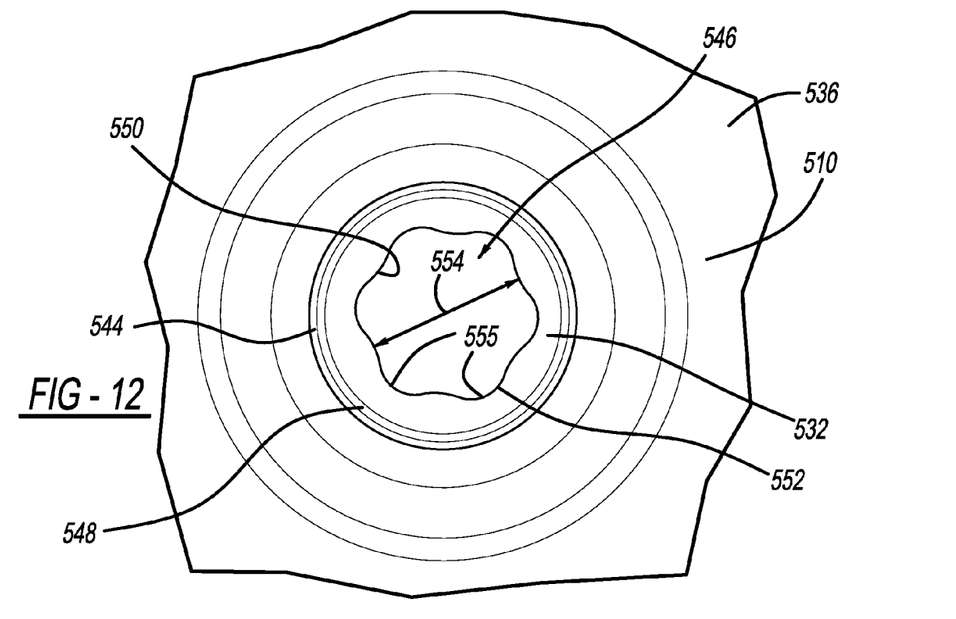
FIG. 12 is a bottom view of an orifice plate having a large rounded spline configuration according to another example of the present disclosure.

With reference to FIG. 12, an orifice plate 510 constructed in accordance to additional features is shown. The orifice plate 510 can include a plate body 536 having a flange (not specifically shown, but constructed like the flange 140, FIG. 6), a downstream portion (not shown) and a nipple portion 544. A central passage 546 can be defined through the nipple portion 544. The nipple portion 544 has a terminal end 548 that defines the valve seat 532. The valve seat 532 generally comprises an orifice 550 having splines 552 arranged around an outer diameter 554 thereof. The splines 552 are in the form of large rounded inlets 555. It will be appreciated that the splines shown in the figures may take other shapes.

The splines 152, 252, 352, 452 and 552 described herein and formed on an orifice of a valve plate provide advantages over prior art configurations. The splines on the outer diameter of the orifice allow the orifice plate 110, 210, 310, 410 and 510 and therefore the valve to reopen easier by acting like small pilot valves. In this regard, the reopening force can be concentrated across just a small portion of the orifice until the pressure equalizes across the entire valve at which time it is easier to open the entire valve. A plurality of small splines, uniformly arranged around the orifice perimeter assures that the valve can open equally well in all directions without having a preferred orientation of the flapper. While the splines shown herein are uniformly arranged around the orifice perimeter, other configurations are contemplated. For example, a pattern of one large spline, one small spline may repeat. Alternatively, random patterns may be implemented. Further, other fractal like-shapes such as a maple leaf or clover with serrated edges may be used. When the valve associated with the orifice plates 110, 210, 310, 410 and 510 closes a solid or elastomer flapper (see flapper assembly 134 above) presses against the orifice 150, 250, 350, 450 and 550 preventing flow. In use, a pressure drop may develop across the orifice plate 110, 210, 310, 410 and 510 assisting in holding the flapper closed. Considerable force must be developed to reopen the valve if the orifice were of consistent diameter. The valves described herein having splined profiles allow the valve to reopen more easily. Moreover, a regular pattern of splines allow the flapper or seal to peel away easily in any direction whereas a slot or tear drop may require a preferred orientation to reopen. The orifice plates 110, 210, 310, 410 and 510 can be formed of a rigid plastic material.

Figure 13:
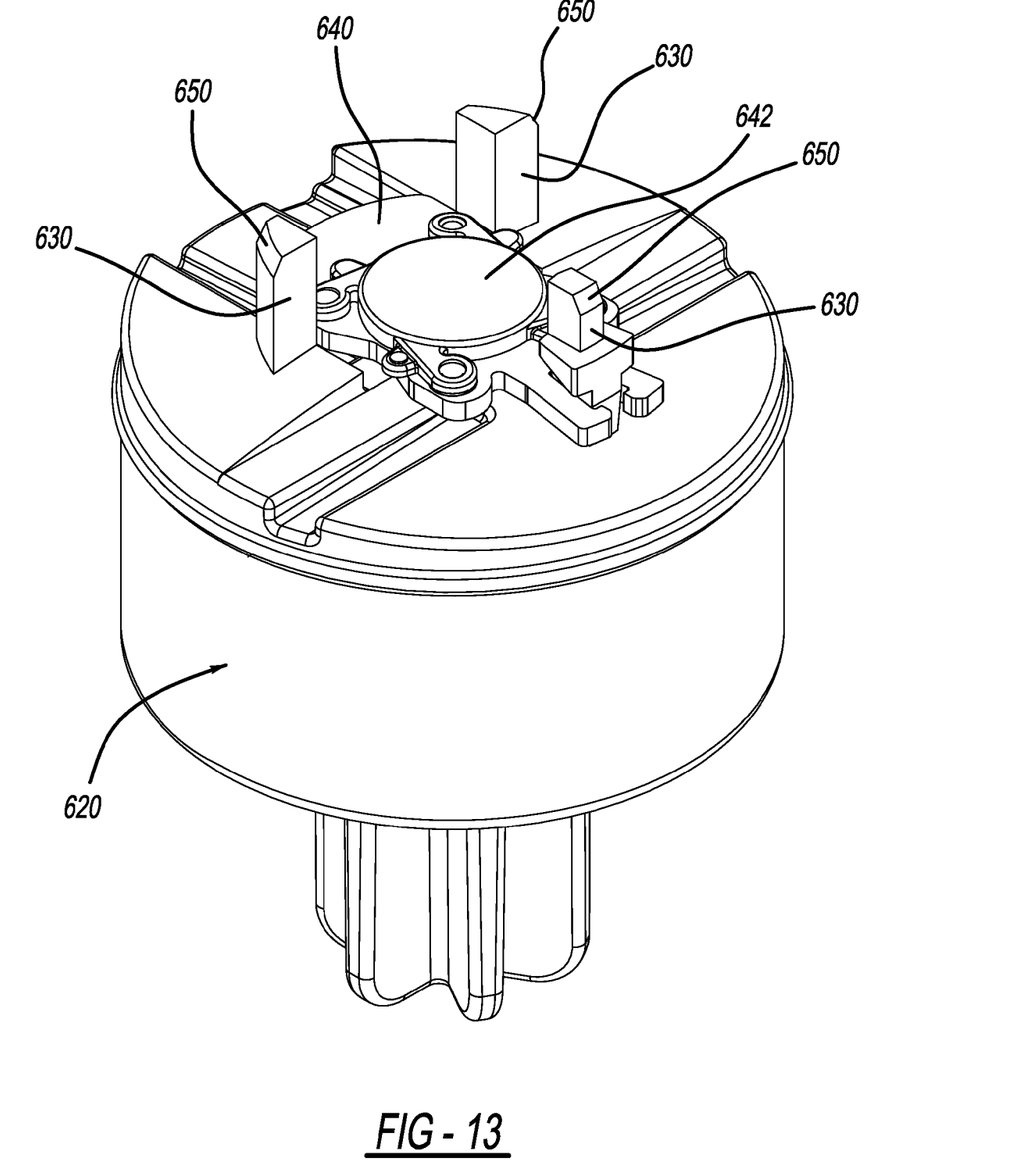
FIG. 13 is a perspective view of a portion of a vent valve constructed in accordance to additional features.
Figure 14:
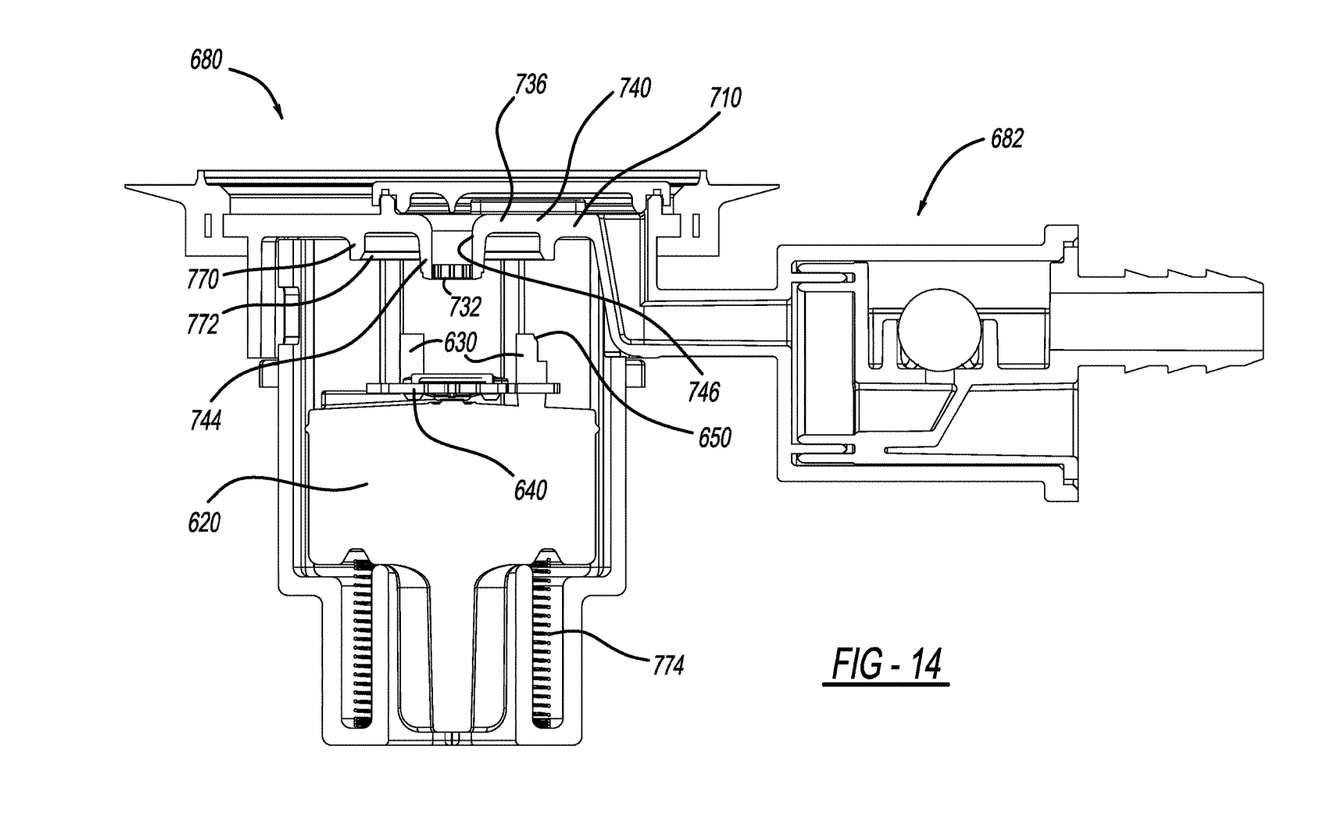
FIG. 14 is a sectional view of the vent valve of FIG. 13 and shown in an open position.
Figure 15:
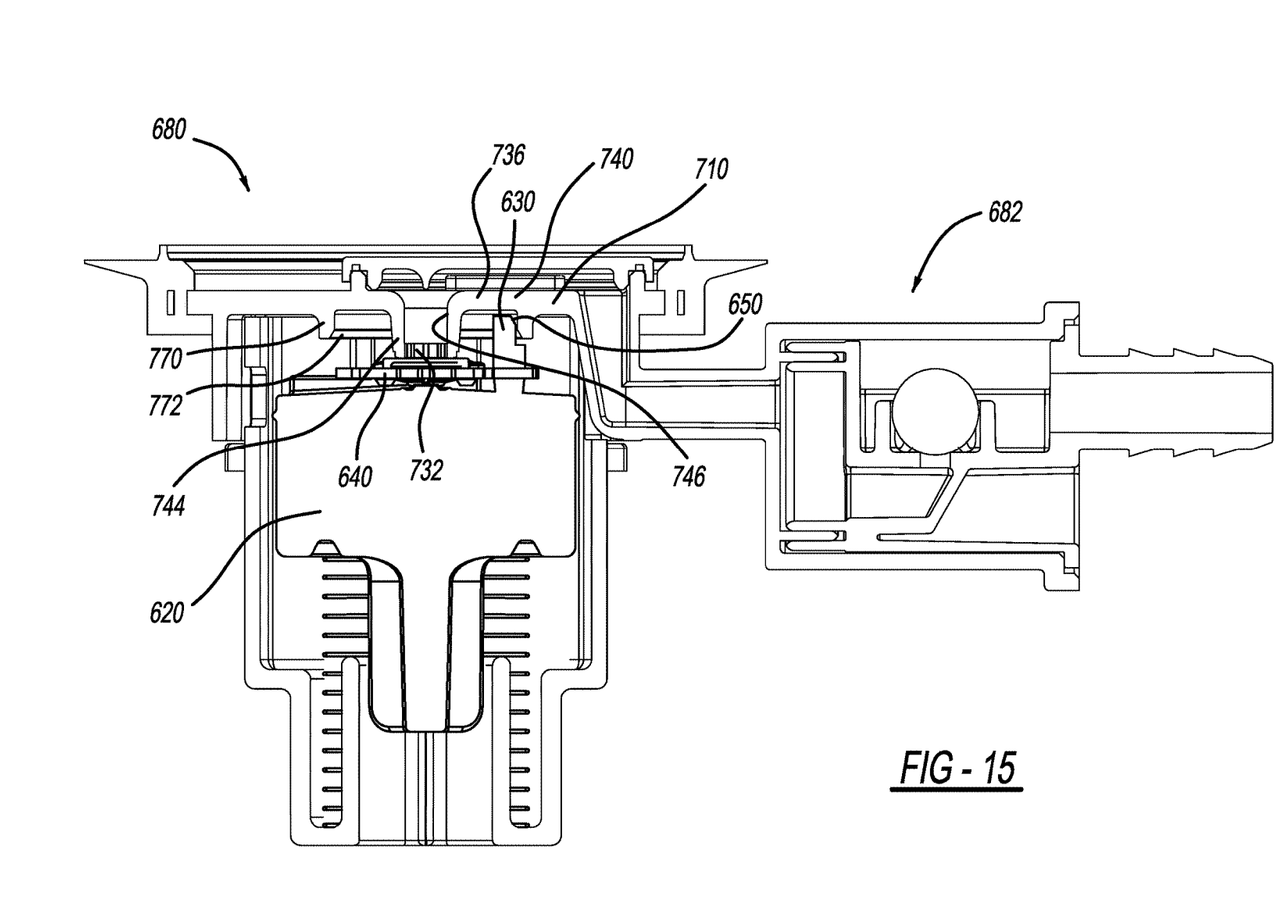
FIG. 15 is a sectional view of the vent valve of FIG. 14 and shown in a closed position.

Turning now to FIGS. 13-15, a float constructed in accordance to additional features of the present disclosure is shown and generally identified at reference 620. In general, the ring or collar 28 (in the example shown in FIG. 2) may be replaced with protrusions or fingers 630 that extend proud from atop of the float 620. The fingers 630 have tapers 650 arranged on outboard surfaces of respective distal tips thereof. As will be described the tapers 650 of the fingers 630 mate with complementary structure on an orifice plate 710 (FIG. 15) in the closed position. A flapper 640 and seal 642 may ride on the float 620. The flapper 640 is generally flat and does not include protuberances as described in FIGS. 3-5.

With specific reference now to FIGS. 14 and 15, the float 620 is shown incorporated in a vent valve 680 that includes a check valve 682. The float 620 is configured to cooperate with an orifice plate 710. The orifice plate 710 can have a valve seat 732 configure similar to any of the valve seats herein. The orifice plate 710 further includes a plate body 736 having a flange 740, a nipple portion 744 that defines a central passage 746 and an outer ring 770 having a taper 772 arranged on an inner diameter thereof. When the float 620 moves from an open position (FIG. 14) to the closed position (FIG. 15) with assistance from a spring 774, the fingers 630 slip inside or inboard of the outer ring 770 for precise orientation of the float 620 and the flapper 640. The first and second tapers 650 and 772 can cooperate to guide the float 620 toward the sealed, closed position. The configuration allows much of the length of the orifice plate 710 to be removed giving the valve a very high shut-off (closure). In another configuration, a short wall may be configured around the flapper 640 in its down (fully open) position and attached to the top of the float 620 so that the flapper 640 can get out of the turbulent air stream and remain fully down to give the valve a higher flow rate.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A vent valve for a fuel system comprising:
   a float;
   a flapper assembly having a flapper and a seal mounted on or affixed to the flapper, the flapper assembly movably engaged with the float;
   an orifice plate having a plate body that includes a tubular nipple portion having an inner wall and extending to a terminal end that defines a valve seat, the inner wall at the terminal end defining a valve seat orifice with splines extending radially inward from the inner wall and arranged around an outer diameter of the orifice; and
   wherein the seal is configured to selectively engage the valve seat between a sealed, closed position and an unsealed, open position,
   wherein the splines are disposed at the terminal end of the nipple portion such that in the closed position the seal is disposed against and parallel to the splines, wherein the splines facilitate movement of the seal from the closed position to the open position with reduced reopening force.

2. The vent valve of claim 1 wherein the splines are uniformly arranged around the valve seat.

3. The vent valve of claim 1 wherein the orifice plate is formed of plastic.

4. The vent valve of claim 1 wherein the splines are in the form of rounded inlets.

5. The vent valve of claim 1 wherein the splines are in the form of radial inlets.

6. The vent valve of claim 1 wherein the splines are in the form of triangular inlets.

7. The vent valve of claim 1 wherein the splines are in the form of one of v-shaped inlets and rectangular inlets.

8. The vent valve of claim 1, further comprising:
   at least one protuberance engaged with the flapper, the at least one protuberance spaced from the seal and increasing a weight of the flapper.

9. The vent valve of claim 8 wherein the at least one protuberance is further defined as a plurality of protuberances.

10. The vent valve of claim 9 wherein the at least one protuberance and the flapper have the same thickness.

11. The vent valve of claim 1 wherein the float includes a plurality of fingers extending from an upper surface of the float toward the orifice plate.

12. The vent valve of claim 11 wherein the fingers are configured to locate inside of a ring extending from the orifice plate in the sealed, closed position.

13. The vent valve of claim 12 wherein the fingers have first tapers arranged on distal ends thereof and the ring on the orifice plate has a second taper arranged on an inner diameter thereof, wherein the first and second tapers selectively engage each other to guide the float toward the sealed, closed position.

14. The vent valve of claim 1, wherein the splines define inlets having a width and a depth, wherein the width is 0.4 mm, the depth is 0.25 mm, and the orifice outer diameter is 3.5 mm.

15. The vent valve of claim 1, wherein the radially extending splines extend perpendicular to a longitudinal axis of the tubular nipple portion.

16. A vent valve for a fuel system comprising:
   a housing;
   a float slidably disposed within the housing;
   a flapper assembly having a flapper and a seal mounted on or affixed to the flapper, the flapper assembly movably engaged with the float;
   an orifice plate coupled to the housing and having a plate body that includes a radially inner annular wall and a radially outer wall extending therefrom and into the housing, the radially inner annular wall disposed radially inward of the radially outer wall, the radially inner annular wall extending to a terminal end that defines a valve seat, the valve seat comprising an orifice;
   at least one protuberance engaged with the flapper; and
   a plurality of fingers extending from an upper surface of the float and configured to be disposed between the radially inner annular wall and the radially outer annular wall in the sealed, closed position;
   wherein the seal is configured to selectively engage the valve seat between a sealed, closed position and an unsealed, open position;
   wherein the orifice has splines arranged around an outer diameter thereof, wherein the splines facilitate movement of the seal from the closed position to the open position with reduced reopening force.

17. The vent valve of claim 16 wherein the at least one protuberance is further defined as a plurality of protuberances.

18. The vent valve of claim 16 wherein the fingers have first tapers arranged on distal ends thereof and the radially outer annular wall has a second taper arranged on an inner diameter thereof, wherein the first and second tapers selectively engage each other to guide the float toward the sealed, closed position.

19. The vent valve of claim 16 wherein the at least one protuberance and the flapper have the same thickness.

20. The vent valve of claim 16 wherein the splines are at least one of rounded, radial, triangular and v-shaped.

* * * * *